(12) United States Patent
Nemirofsky et al.

(10) Patent No.: US 7,240,075 B1
(45) Date of Patent: Jul. 3, 2007

(54) INTERACTIVE GENERATING QUERY RELATED TO TELESTRATOR DATA DESIGNATING AT LEAST A PORTION OF THE STILL IMAGE FRAME AND DATA IDENTIFYING A USER IS GENERATED FROM THE USER DESIGNATING A SELECTED REGION ON THE DISPLAY SCREEN, TRANSMITTING THE QUERY TO THE REMOTE INFORMATION SYSTEM

(75) Inventors: Frank Robert Nemirofsky, Alamo, CA (US); Larry A. Lincoln, Milpitas, CA (US)

(73) Assignee: Exphand, Inc., San Francisco, CA (US)

( * ) Notice: Subject to any disclaimer, the term of this patent is extended or adjusted under 35 U.S.C. 154(b) by 537 days.

(21) Appl. No.: 10/670,998

(22) Filed: Sep. 24, 2003

Related U.S. Application Data

(60) Provisional application No. 60/413,113, filed on Sep. 24, 2002.

(51) Int. Cl.
*G06F 17/00* (2006.01)
*G06F 17/30* (2006.01)
*G09G 5/00* (2006.01)
*G06K 9/36* (2006.01)
*H04N 7/14* (2006.01)
*G01S 1/00* (2006.01)

(52) U.S. Cl. .................. 707/104.1; 707/5; 707/10; 345/619; 382/276; 348/14.03; 342/357.09

(58) Field of Classification Search ............ 707/1–57, 707/100–104.1, 200; 705/1–2, 14, 26–27; 345/2.1, 357.07, 419–420, 357.03, 629, 630; 434/252; 725/116, 131, 86; 709/210–218; 396/435; 348/21–22, 14.03, 141, 584, 586; 382/276; 342/357.06–357.09
See application file for complete search history.

(56) References Cited

U.S. PATENT DOCUMENTS 5,459,529 A * 10/1995 Searby et al. .............. 348/586

(Continued)

FOREIGN PATENT DOCUMENTS

GB 2316527 * 2/1998 .................. 27/28

(Continued)

OTHER PUBLICATIONS

Magnus Berggren, "wireless communication in telemedicine using Bluetooth and IEEE 802.11b", technical report 2001-028, Nov. 2001, 33 pages.*

(Continued)

*Primary Examiner*—Srirama Channavajjala
(74) *Attorney, Agent, or Firm*—Mark J. Spolyar

(57) ABSTRACT

Methods, apparatuses, and systems enabling an interactive information retrieval system that includes a user interface allowing users to graphically generate information queries for objects of interest found in various media, such as television, video, and print. The invention can allow users to designate objects of interest within a television or video display and receive information related to the objects of interest. The invention can also allow users to generate queries designating objects of interest within a graphical image using a GUI.

69 Claims, 7 Drawing Sheets

U.S. PATENT DOCUMENTS

| | | | | |
|---|---|---|---|---|
| 5,580,769 | A | * | 12/1996 | Levy et al. ............... 424/184.1 |
| 5,594,493 | A | * | 1/1997 | Nemirofsky ................. 725/23 |
| 5,761,601 | A | * | 6/1998 | Nemirofsky et al. .......... 725/34 |
| 6,057,833 | A | * | 5/2000 | Heidmann et al. .......... 715/726 |
| 6,065,042 | A | * | 5/2000 | Reimer et al. .............. 709/203 |
| 6,285,995 | B1 | * | 9/2001 | Abdel-Mottaleb et al. ...... 707/3 |
| 6,415,282 | B1 | * | 7/2002 | Mukherjea et al. ............ 707/7 |
| 6,574,616 | B1 | * | 6/2003 | Saghir ............................ 707/1 |
| 6,594,383 | B1 | * | 7/2003 | Syeda-Mahmood ......... 382/162 |
| 6,647,141 | B1 | * | 11/2003 | Li ............................... 382/162 |
| 6,744,403 | B2 | * | 6/2004 | Milnes et al. .......... 342/357.07 |
| 6,864,886 | B1 | * | 3/2005 | Cavallaro et al. ........... 345/420 |
| 6,882,746 | B1 | * | 4/2005 | Naveen et al. .............. 382/173 |
| 6,950,534 | B2 | * | 9/2005 | Cohen et al. ................ 382/103 |
| 7,002,583 | B2 | * | 2/2006 | Rabb, III .................... 345/473 |
| 7,075,556 | B1 | * | 7/2006 | Meier et al. ................ 345/629 |
| 2002/0064764 | A1 | * | 5/2002 | Fishman et al. ............ 434/252 |
| 2002/0069076 | A1 | * | 6/2002 | Faris et al. ..................... 705/1 |
| 2002/0069218 | A1 | * | 6/2002 | Sull et al. ................ 707/501.1 |
| 2003/0142038 | A1 | * | 7/2003 | Folk ............................ 345/2.1 |
| 2004/0107136 | A1 | * | 6/2004 | Nemirofsky et al. .......... 705/14 |
| 2004/0117254 | A1 | * | 6/2004 | Nemirofsky et al. .......... 705/14 |
| 2004/0117255 | A1 | * | 6/2004 | Nemirofsky et al. .......... 705/14 |
| 2006/0087504 | A1 | * | 4/2006 | Meier et al. ................ 345/418 |

FOREIGN PATENT DOCUMENTS

| | | | | |
|---|---|---|---|---|
| GB | 2353123 | * | 2/2001 | ...................... 7/88 |
| GB | 2382003 | * | 5/2003 | ...................... 7/32 |
| GB | 2392073 | * | 2/2004 | .................... 17/30 |
| GB | 2406290 | * | 3/2005 | .................... 13/0 |
| WO | WO 99/27727 | * | 6/1999 | ...................... 7/24 |
| WO | WO 00/23918 | * | 4/2000 | .................... 17/30 |
| WO | WO 0129681 | * | 4/2001 | |
| WO | WO 2005/091211 | * | 9/2005 | ...................... 9/0 |
| WO | WO 2005/122526 | * | 12/2005 | ...................... 7/0 |
| WO | WO 2006/005187 | * | 1/2006 | ...................... 7/0 |
| WO | WO 2006042191 | * | 4/2006 | ...................... 8/6 |

OTHER PUBLICATIONS

Neil J Gunther et al. "A benchmark for image retrieval using distributed systems over the internet: BIRDS-1", 13th IS&T/SPIE symposium on electronic imaging-science and technology Jan. 25, 2001, 14 pages.*

Minerva M Yeung, "On multimedia technology & infrastructure for emerging application: from desktop to wireless to peer-to-peer", Stanford seminar, Feb. 20, 2001, 20 pages.*

Chenyang Lu et al. "RAP:a real-time communication architecture for large-scale wireless sensor networks", proceedins of the eighth IEEE real-time and embedded technology and applications symposium, 2002.*

Fushikida,K et al. "A content based video query agent using feature based image search engine",proceedings, third international conference on computatiional intelligence and multimedia applications, Sep. 1999, pp. 181-185.*

Xu,YY et al. "A WWW based intelligent multimedia information query and retrieve system", Multimedia and expo, 2000 ICME 2000, Aug. 2000, vol. 2, pp. 731-734.*

Mulligan,J et al. "view-independent scene acquisition for tele-presence", IEEE and ACM international symposium on Augmented reality, 2000, pp. 105-108.*

Saund,E et al. "perceptual organization in an interactive sketch editing application", proceedings, fifth international conference on computer vision, 1995, , pp. 597-604.*

* cited by examiner

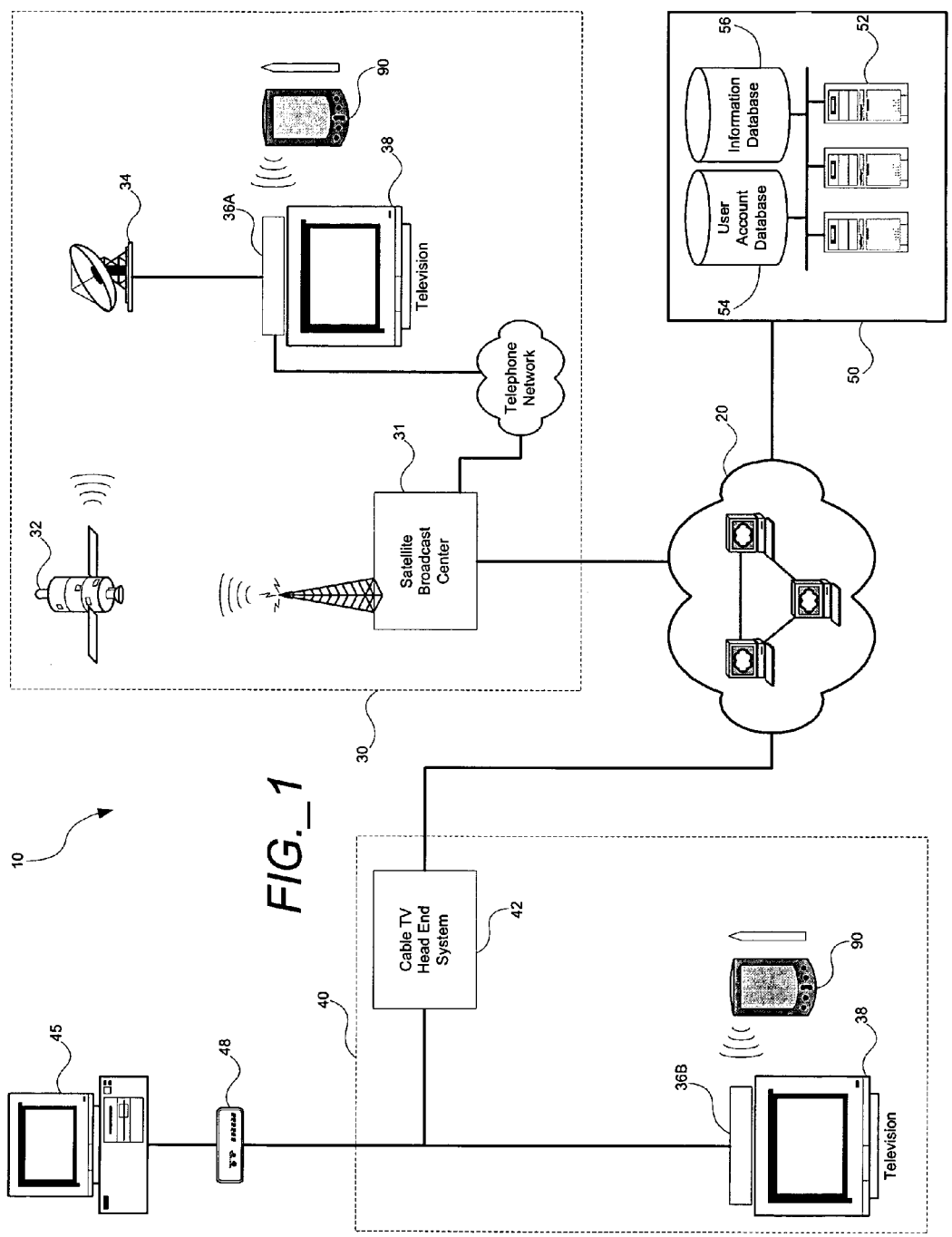
FIG_1

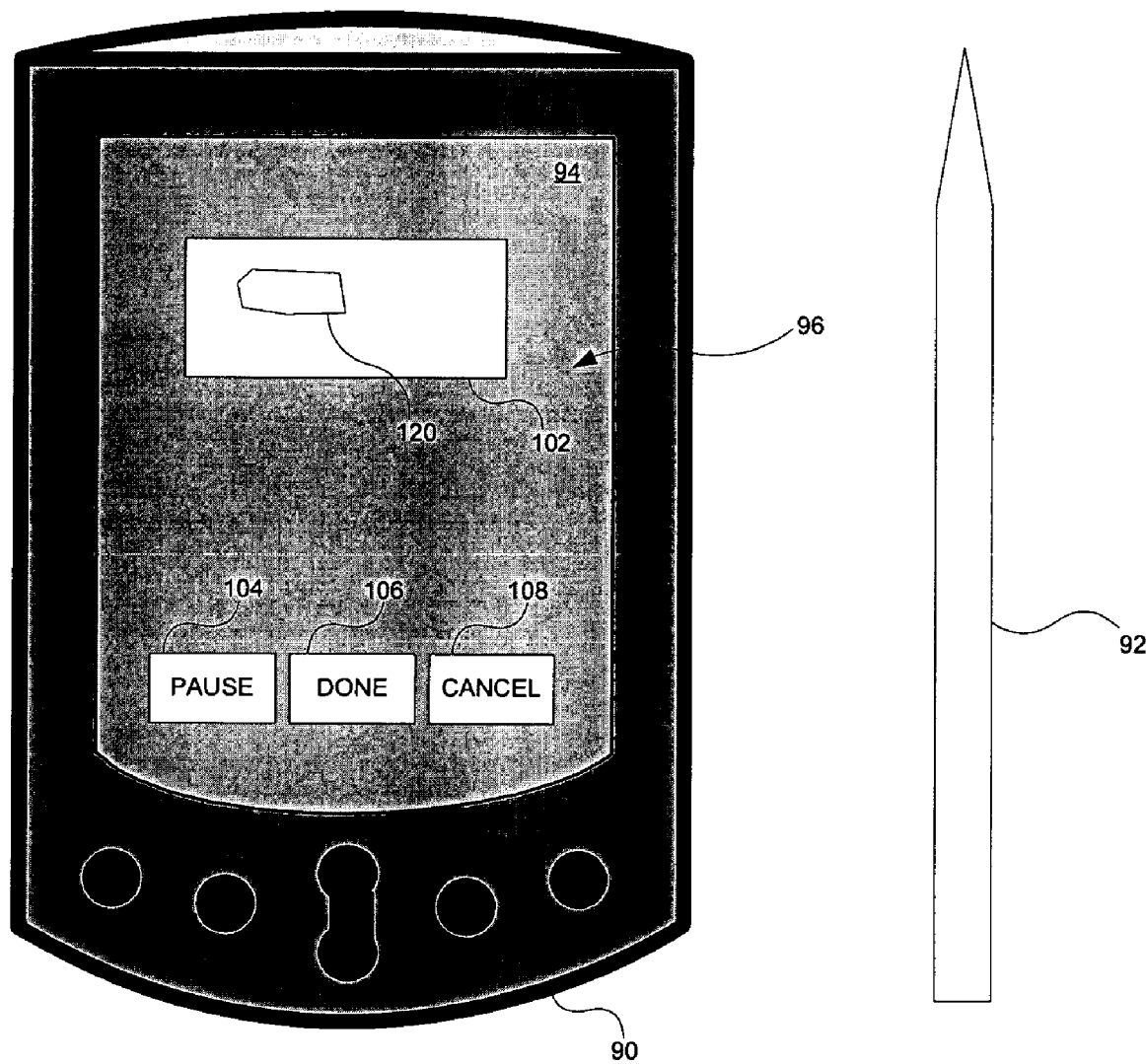
FIG._2

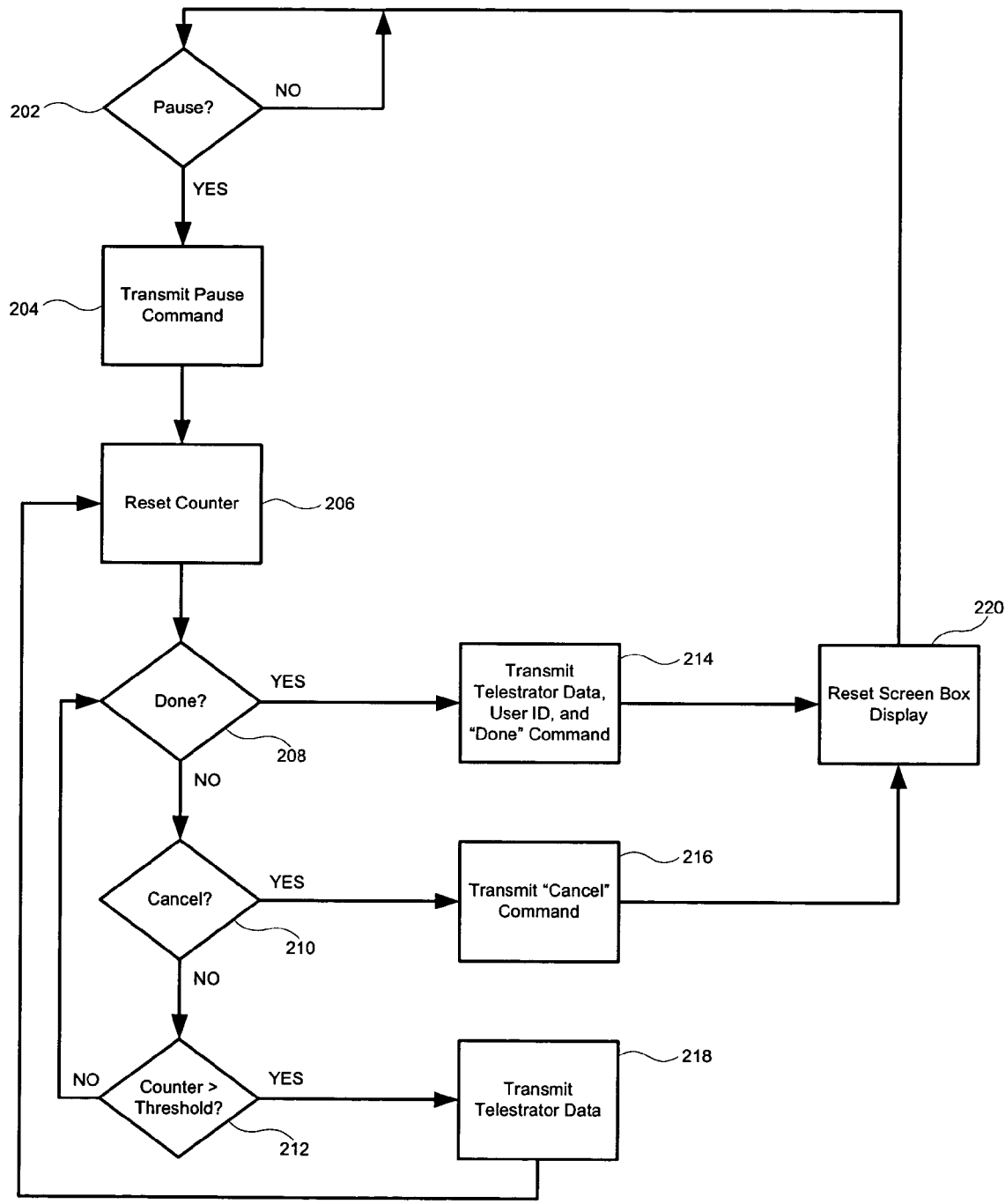
FIG._3A

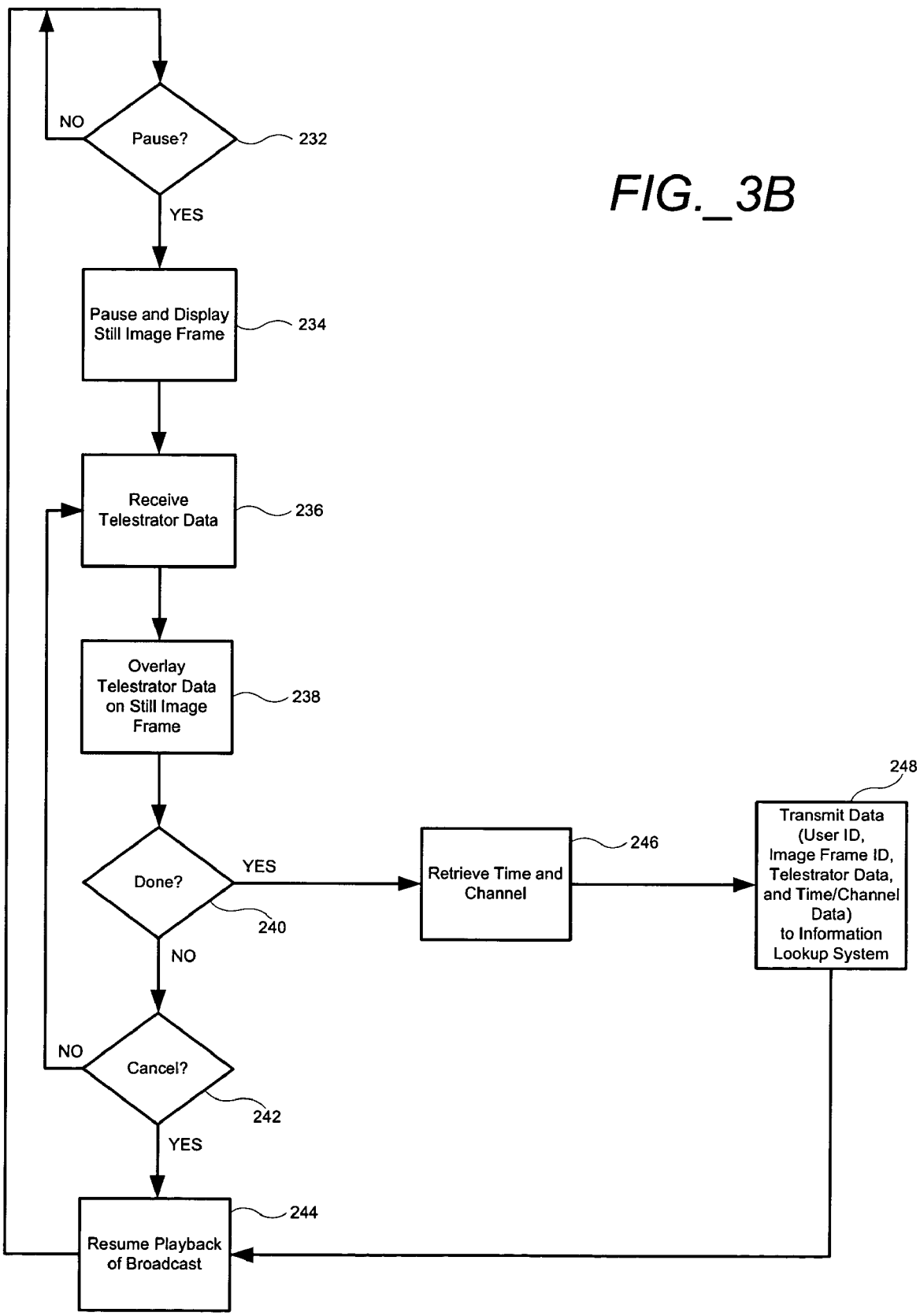
FIG._3B

| Frame ID | Object 1 | Object 2 | Object 3 | Object 4 | ... | Object N |
|---|---|---|---|---|---|---|
| 1-M | (x,y) | (x,y) | | | | |
| (M+1) to N | (x,y) | | (x,y) | | | |
| (N+1) to O | | (x,y) | | | | |
| (O+1) to ... | | | | (x,y) | | (x,y) |
| ... | | | | | | |
| ...to END | | | | | | |

*FIG. 4*

| ObjectID | URL | Ad Content | Coupon Offer |
|---|---|---|---|
| Object1 | info.lookup.com/program1/object1.htm | object1.ad.htm | object1.coup.htm |
| Object2 | info.lookup.com/program1/object2.htm | object2.ad.htm | object2.coup.htm |
| Object3 | info.lookup.com/program1/object3.htm | | |
| Object4 | | object4.ad.htm | object4.coup.htm |
| ... | | | |
| ObjectN | | | |

*FIG. 5*

INTERACTIVE GENERATING QUERY RELATED TO TELESTRATOR DATA DESIGNATING AT LEAST A PORTION OF THE STILL IMAGE FRAME AND DATA IDENTIFYING A USER IS GENERATED FROM THE USER DESIGNATING A SELECTED REGION ON THE DISPLAY SCREEN, TRANSMITTING THE QUERY TO THE REMOTE INFORMATION SYSTEM

CROSS-REFERENCE TO RELATED APPLICATION

The present application claims the benefit of U.S. Provisional Application Ser. No. 60/413,113 filed Sep. 24, 2002.

FIELD OF THE INVENTION

The present invention relates to interactive television or computer systems, namely, methods, apparatuses, and systems enabling an interactive information retrieval system featuring a graphical user-interface (GUI) for selecting objects of interest shown within an image, such as a television or other video image frame, print media, and the like.

BACKGROUND OF THE INVENTION

There are myriad documents and files accessible over the Internet. Retrieving desired information on the Internet, however, generally requires knowledge of an associated Uniform Resource Locator (URL) or data location. For example, if a consumer wishes to obtain information about or order a particular company's product on the World Wide Web (WWW), she must know the URL corresponding to that company's web site. Conversely, if a corporation wants the public to visit a web site containing information about its products, the corporation will typically advertise its web site and corresponding URL in television, radio, print or other media. A consumer may then enter this URL, assuming he remembers it, into a web browser and access the web site.

When a specific URL or data location is not known, search engines are a way of locating desired information. A user typically enters key words or search terms into a search engine, which returns a list of URLs corresponding to web sites or USENET groups where the key words or search terms were found. A search engine will often return a large list of web sites, through which the user must wade to locate the few web sites relevant to her query.

Due in part to the proliferation of commercial web sites, consumers have become accustomed to the notion that there is a web site containing information for the vast majority of products and services being commercially offered. Yet, as described above, access to a particular web site on the Internet requires knowledge of the actual URL or access to a search engine. This becomes problematic when there is no immediate access to a computer connected to the Internet. For example, when a person sees an item displayed on a television and desires further information, he must remember characteristics about the item. At a later time, the person can enter those characteristics as search terms in a typical search engine. Alternatively, assuming the broadcast advertisement or program displays an "800" number, the user may use the number and access a telephone operator or call center to obtain more information and/or order the item. Beyond these methods, however, there are few ways of efficiently identifying data locations or URLs, or accessing other relevant resources, based upon an observation of a particular object or event. In light of the foregoing, it can be seen that a need exists for alternative methods of identifying URLs, or other data locations on a computer network, offering information corresponding to objects displayed in other media, such as television broadcasts and print.

SUMMARY OF THE INVENTION

The present invention provides methods, apparatuses, and systems enabling an interactive information retrieval system that includes a user interface allowing users to graphically generate information queries for objects of interest found in various media, such as television, video, and print. The invention can allow users to designate objects of interest within a television or video display and receive information related to the objects of interest. The invention can also allow users to generate queries designating objects of interest within a graphical image using a GUI.

DESCRIPTION OF THE DRAWINGS

FIG. 1 is a functional block diagram setting forth an interactive information retrieval system according to an implementation of the invention.

FIG. 2 depicts a client device including a user interface for use in connection with an implementation of the invention.

FIG. 3A is a flow chart illustrating a method, according to an implementation of the invention, directed to interacting with a receiver to designate a selected region within an image frame.

FIG. 3B is a flow chart illustrating a method, according to an implementation of the invention, directed to processing telestrator input from a client device and transmitting information lookup requests.

FIG. 4 is an object locator table including positional parameters corresponding to a selected region in relation to frame identifiers or frame set identifiers.

FIG. 5 is an object information table storing computer network addresses in association with object identifiers for a plurality of content types (e.g., information, ads, and coupons).

DESCRIPTION OF PREFERRED EMBODIMENT(S)

Figure 6:
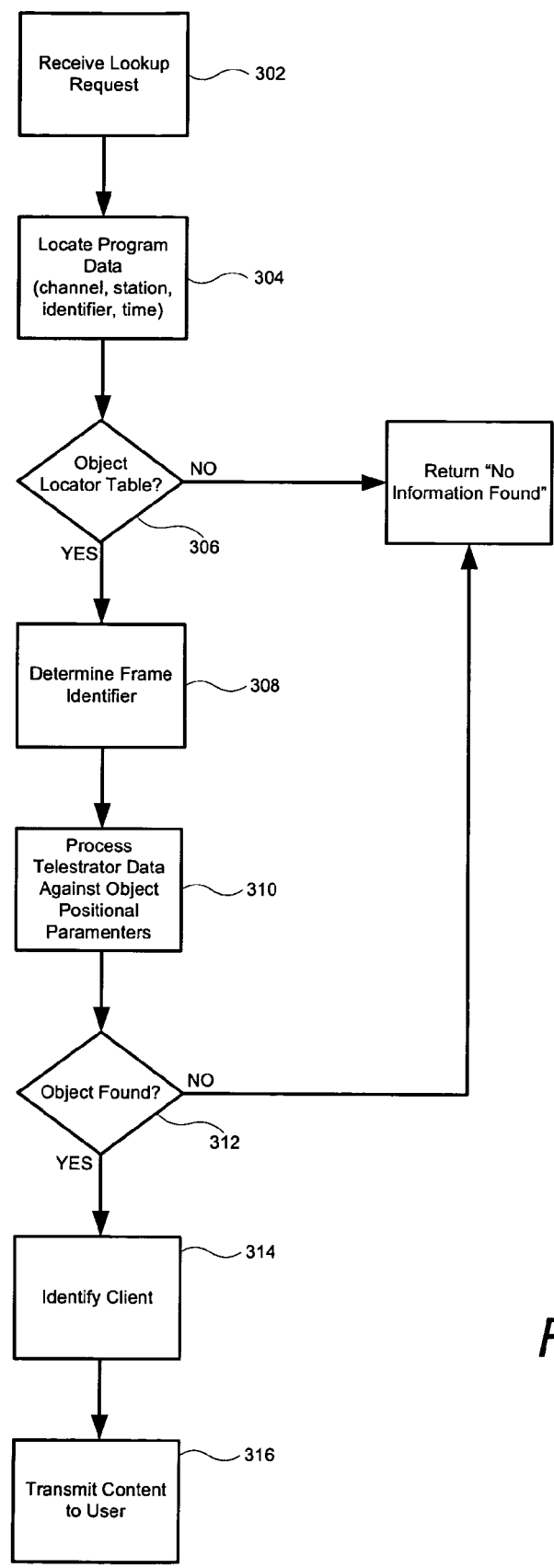
FIG. 6 is a flow chart illustrating a method, according to an implementation of the invention, for identifying objects in response to a lookup request and retrieving information related to the objects.

FIG. 1 illustrates an interactive information retrieval system 10 according to one implementation of the invention. The information retrieval system operates in connection with a computer network 20. In the implementation shown in FIG. 1, computer network 20 comprises an Internet Protocol (IP) network, such as the Internet. Computer network 20 can be any suitable computer network, including but not limited to an open, wide-area network (WAN), an electronic network, an optical network, a wireless network, and/or any combination thereof. Computer network 20 can be a packet-based communications environment, employing TCP/IP protocols and having a plurality of interconnected digital packet transmission stations operative to route data between TCP/IP end systems. The invention, however, has applications in computer network environments employing any suitable transport layer and network layer protocols.

As FIG. 1 illustrates, implementations of the invention operate in a distributed computing environment. In one implementation, the distributed computing environment can include a direct broadcast satellite (DBS) system 30 that comprises a satellite broadcast center 31, a satellite 32, a satellite dish 34, a satellite receiver 36A, a display device such as a television 38, and a client device 90. In another implementation, the distributed computing environment can include a cable television system 40 that comprises a cable television head end system 42, a cable receiver 36B, a display device such as television 38, and client device 90. And in further implementations, the distributed computing environment can include a client computer 45 that is coupled to the computer network 20 through a cable modem 48 or a Digital Subscriber Line (DSL) modem (not shown). The distributed computing environment also includes an information lookup system 50.

An implementation of client device 90 includes a display, a user interface, and functionality for wireless communications. This functionality can be implemented using, for example, infrared signals (e.g., IrDA), radio signals (e.g., 802.11 technologies (Wi-Fi) or Bluetooth), short burst Ethernet, and message services such as Short Message Service (SMS) and Multimedia Message Service (MMS). In implementations of the invention, client device 90 can comprise a personal digital assistant (PDA), a mobile phone, a combination of a PDA and a mobile phone, or other wireless devices. In some implementations, client device 90 can include a digital camera.

Information LookUp System

Information lookup system 50 can interact with client device 90, as described more fully below, to retrieve information related to an object of interest designated by a user using client device 90. In one implementation, information lookup system 50 comprises at least one application server 52, a user account database 54, and an information database 56.

Application server 52 includes functionality implementing the process flows described herein. User account database 54 stores information related to at least one user account. In one implementation, such user account information includes, but is not limited to, a user account identification, name, address, e-mail address, fax number (and, optionally, other personal contact information), as well as system settings, preferences, psychographic information, demographic information, and behavioral information obtained through monitoring a user's use of the system described herein. For example, user account database 54 can store information related to the user's age, marital status, children, cars owned, income level, home ownership status (e.g., owner vs. renter), time at current residence, etc. User account database 54 can also store information gleaned from the use of the information retrieval system by the user as described herein, such as a log of information requests, etc. User account database 54 can further store financial account information for at least one user to facilitate financial transactions.

Information database 56 stores information related to one or more objects embodied in images (e.g., still or video images) that are broadcast, streamed, transmitted, printed, or otherwise disseminated to users and displayed on a display device, such as television 38 or the monitor associated with client computer 45, or in print media.

Direct Broadcast Satellite System

DBS system 30 is operative to provide broadcast satellite television services to subscribers. Satellite broadcast center 31 receives incoming television programming from companies (e.g., CNN and ESPN) and then converts the television programming into an encoded digital television (DTV) broadcast signal. The encoding format used is generally MPEG-2. To reach all of its subscribers, DBS system 30 employs one or more satellites 32 that are in geosynchronous orbits above the Earth to deliver the broadcast signal. The encoded DTV broadcast signal is sent from satellite broadcast center 31 to one or more of these orbiting satellites 32 and the broadcast signal is then rebroadcast back down to subscribers on Earth who can receive the broadcast signal using satellite dish 34. The broadcast signal is captured by satellite dish 34 and then transmitted to satellite receiver 36A where the broadcast signal is decoded and displayed on television 38. The decoded broadcast is made up of a number of image frames that are displayed in rapid succession.

In one implementation, satellite receiver 36A comprises one or more microprocessors for running an operating system (such as Linux or Windows CE), and for parsing the video data transport stream (e.g., MPEG streams, etc.) within the broadcast signal. Satellite receiver 36A can also include RAM, an MPEG decoder chip, and other chips for audio decoding and processing. However, as one skilled in the art will recognize, the exact contents of a satellite receiver depend on the DTV standard used. Satellite receiver 36A can further include a hard drive for storing recorded television broadcasts, downloaded software, and other applications. In an implementation, satellite receiver 36A can be physically integrated into television 38 or any other display device.

In one implementation, satellite receiver 36A can transmit data in the upstream direction through a telephone line back to another portion of DBS system 30, such as satellite broadcast center 31. This completes a communication loop between satellite receiver 36A and satellite broadcast center 31 (i.e., satellite receiver 36A can receive broadcast signals from DBS system 30 through satellite dish 34 and can also transmit signals back to DBS system 30). Satellite receiver 36A can also include a telestrator application that is invoked when a command signal is received from client device 90, as discussed more fully below.

Cable Television Data Transmission System

Cable television system 40 is operative to provide cable television services and cable modem services to subscribers. In one implementation, cable head end system 42 can include a satellite dish antenna (not shown) for receiving incoming programming, which is passed on to the subscriber. In one embodiment, cable head-end system 42 further includes internet access functionality, including a Cable Modem Termination System (CMTS) (which sends and receives digital cable modem signals on a cable network) to provide Internet services to subscribers.

Cable modem 48 communicates with the CMTS associated with cable head-end system 42 to provide client computer 45 with access to resources on computer network 20. Cable modem 48 can be an external device (as shown) or it can be integrated within client computer 45.

Cable television system 40 includes a cable receiver 36B that receives and decodes DTV broadcasts transmitted from cable head-end system 42. Like the satellite broadcast, the decoded cable broadcast is made up of a number of image frames that are displayed in rapid succession. In one embodiment, similar to satellite receiver 36A, cable receiver 36B comprises one or more microprocessors for running an operating system (such as Linux or Windows CE), and for parsing the video data transport stream (e.g., MPEG streams, etc.). Cable receiver 36B can also include RAM, an MPEG decoder chip, other chips for audio decoding and processing, and a hard drive for storing recorded television broadcasts, downloaded software, and other applications. In an implementation, cable receiver 36B can be physically integrated into television 38 or any other display device.

Again, the exact contents of a cable receiver depend on the DTV standard used. In one implementation, cable receiver 36B transmits data in the upstream direction through a telephone line, rather than the cable connection. And similar to satellite receiver 36A, in one implementation cable receiver 36B can include a telestrator application that is invoked when a command signal is received from personal digital assistant 90, as discussed more fully below.

Satellite receiver 36A and cable receiver 36B (collectively referred to herein as "receiver 36") can each include functionality for wirelessly communicating with client device 90. In one implementation, client software can enable client device 90 to transmit "pause" commands, and receiver 36 can include functionality to pause a satellite broadcast or cable broadcast when such pause commands are received. When a broadcast is paused in this manner, an image frame is displayed that corresponds to the moment when the pause command was received.

Receiver 36 is also operative to receive and process signals from client device 90 that designate a selected region of the image frame. In implementations of the invention, receiver 36 can display the selected region of the image frame or overlay the image frame with markings or symbols that designate the selected region. As discussed more fully below, receiver 36 can further include functionality for communicating with information lookup system 50 to provide information, if any, associated with one or more objects contained within the selected region of the image frame designated by the user. In one implementation, receiver 36 can include a real-time clock and functionality that communicates with either DBS system 30 or cable television system 40 to synchronize the real-time clock with a central clock. The central clock can be maintained at a location such as DBS system 30 or cable television system 40.

To facilitate initiation and maintenance of user accounts, users can manage their respective user accounts by accessing information lookup system 50 through a network access device (not shown) connected to computer network 20. In one implementation, the network access device is a browser executed on client computer 45 or a network computer (not shown). In one implementation, page-based interfaces for accessing information lookup system 50 are transmitted to client computer 45 having a browser and a connection to computer network 20.

Client computer 45 can comprise any computer, special-purpose computing device, or any other suitable device having the required functionality. In one implementation, client computer 45 includes at least one processor, a data storage system (including volatile and non-volatile memory), at least one input device (e.g., a keyboard), and at least one output device (e.g., a display). In one implementation, client computer 45 is connected to computer network 20 through a modem connection (e.g., dial-up, DSL, or cable) or through a network line. Such connections can be wireless as well. In addition, although implementations of the system are described as working in conjunction with a browser, any suitable device, application, or client software for receiving, displaying, and transmitting data over a computer network can be used. In one implementation, the browser implemented on client computer 45 supports the SSL ("Secure Sockets Layer") protocol, the S-HTTP ("Secure HTTP") protocol, or any other similar protocol for transmitting confidential or private information over an open computer network. Users are individuals or other legal entities having the capacity to possess financial accounts, such as corporations, partnerships, non-profit organizations, trusts, and the like.

Client Device

FIG. 2 illustrates one implementation of client device 90 as a personal digital assistant (PDA), which is a mobile hand-held device that provides computing and information storage and retrieval capabilities using applications installed therein. Client device 90 can be a pen-based device, using a stylus 92 and a touch sensitive screen 94 (rather than a keyboard) for input. Client device 90 further includes an infrared port for wireless communication of data with a second device, such as receiver 36. In other implementations, client device 90 can include speech recognition functionality allowing for a voice-based user interface operative to receive voice commands (e.g., "pause" command, see below) from users, or can use other methods of wireless communication, such as Bluetooth or 802.11 technologies.

FIG. 2 also illustrates one implementation of a user interface 96 that comprises an installed application (i.e., client software) enabling a user to transmit commands to receiver 36 that cause the receiver to perform actions such as pausing a broadcast and designating selected regions on the image frame displayed on television 38. One implementation of user interface 96 can include a screen display box 102, a "pause" button 104, a "done" button 106, and a "cancel" button 108.

Screen display box 102 can have dimensions that correspond to the aspect ratio of a standard television display (e.g., 4×3 or 16×9); however, any suitable aspect ratio can be used depending on the display device type. As discussed below, screen display box 102 provides an area in which a user can draw or designate a selected region 120 within an image frame displayed on a display device, such as television 38. This selected region 120 contains one or more object of interest for which the user desires further information.

Activation of "pause" button 104 causes client device 90 to transmit a pause command via a wireless signal, and activation of "done" button 106 causes client device 90 to transmit data defining selected region 120 via wireless signals. These wireless signals can be received and processed by receiver 36. "Cancel" button 108 allows the user to cancel previous commands and allows receiver 36 to resume normal broadcast display operations.

Operation of Client Device and Receiver

In one implementation of the invention, a user can use client device 90 to pause a live video broadcast (e.g., a cable broadcast or a satellite broadcast), designate one or more selected regions within an image frame shown on a display device, and transmit a query through receiver 36 to information lookup system 50 to retrieve information, if any, corresponding to the query.

FIG. 3A depicts an implementation of a method for pausing live video and allowing a user to graphically generate a query by designating a selected region within an image frame. The method of FIG. 3A is carried out using client device 90 configured to include a telestrator client application and user interface 96. As FIG. 3A shows, the telestrator client application, when launched, waits for the user to issue a pause command (step 202). When the user touches or otherwise activates "pause" button 104, client device 90 transmits a pause command to receiver 36 using its infrared port (step 204). Once the pause command is issued, the user provides input by drawing selected region 120 around objects of interest within screen display box 102. This input, consisting of lines and curves drawn by the user on screen display box 102, is telestrator data. The telestrator data can be entered using a stylus on a touch-sensitive display, or using other methods such as a mouse or other input device. The objects of interest are objects shown within the image frame for which the user desires further information. In one implementation, the user completes drawing selected region 120 and activates "done" button 106 to transmit the telestrator data defining selected region 120 to receiver 36.

In the implementation of FIG. 3A, the telestrator data defining selected region 120 is displayed on the display device, such as television 38, as it is input by the user. More specifically, the telestrator client application resets a counter (step 206) and, when the counter reaches a predetermined threshold (step 212), client device 90 transmits to receiver 36 the telestrator data input by the user as it exists when the threshold is reached (step 218). The counter threshold, in one implementation, can be configured such that the telestrator data is transmitted several times every second. For instance, the telestrator data can be transmitted every hundredth of a second, every tenth of a second, every half-second, once every second, any other time interval that is acceptable. When the telestrator data is received by receiver 36, the telestrator data is presented on the paused image frame, so whatever portion of selected region 120 that has been drawn is now shown to the user. This allows the user to monitor his or her progress on the display of television 38 as he or she draws selected region 120. Therefore, as the user draws selected region 120 on screen display box 102, the lines and curves she is drawing appear on television 38.

When the user is finished drawing selected region 120 in screen display box 102, the user activates "done" button 106 (see step 208), causing the telestrator client application to transmit the telestrator data defining selected region 120 and a "done" command, including user identification data (step 214). The telestrator client application then resets the screen display box 102 (step 220). As FIG. 3A illustrates, the user can cancel the operation at any time by activating "cancel" button 108 (see step 210), thereby causing the telestrator client application to transmit a cancel command to receiver 36 (step 216) and reset screen display box 102 (step 220). In other implementations, user interface 96 is responsive to a mere tap or scribble on screen 94 (rather than the drawing of selected region 120). In these implementations, the telestrator data consists of the point where the tap occurred or the lines and curves forming the scribble. The positional parameters associated with the tap or scribble can be used to identify objects of interest, as discussed below.

FIG. 3B sets forth a method implemented by receiver 36 to process commands received from client device 90 and transmit graphically generated queries to information lookup system 50. In this implementation, receiver 36 includes a telestrator receiver application that is invoked upon detection of a command transmitted from client device 90, such as a pause command. As FIG. 3B illustrates, the telestrator receiver application operates in the background and monitors for a pause command (see step 232) while receiver 36 performs its normal operations of decoding broadcast signals from either DBS system 30 or cable television system 40 and transmitting analog or digital signals to television 38 for display. When a pause command is received, the telestrator receiver application is invoked and receiver 36 pauses normal transmission of the broadcast stream, thereby displaying a still image frame substantially corresponding to the image frame that was being displayed at the moment the pause command was received (step 234).

The telestrator receiver application, in one implementation, stores in a memory of receiver 36 (e.g., a buffer) the image frame data, the time associated with the image frame, and the channel to which receiver 36 has been tuned, or embedded station identifier and/or frame identifier information as obtained from the Vertical Blanking Interval (VBI) data. In another implementation, the station and/or frame information can be embedded in the image data portion of the television signal. For digital video streams, the station and/or frame information can also be embedded at any suitable location in the stream. The telestrator receiver application then monitors for telestrator data and/or other command signals transmitted from client device 90.

In one implementation, when the telestrator receiver application receives telestrator data from client device 90 (step 236), the telestrator receiver application causes receiver 36 to overlay this telestrator data onto the paused image frame (step 238). Since the telestrator data from client device 90 generally consists of lines and curves describing selected region 120, the data overlaid onto the paused image frame will also consist of lines and curves corresponding to selected region 120. As discussed above, client device 90 is configured to periodically transmit updated telestrator data to receiver 36 that is overlaid onto the paused image frame, thereby allowing the user to monitor his or her progress on television 38 while drawing selected region 120.

If the telestrator receiver application detects a done command (step 240), it can retrieve the time and channel/station identifier information associated with the paused image frame from the buffer (step 246). The telestrator receiver application can transmit a block of information to information lookup system 50. This block of information can include the user identification information associated with the done command, an image frame identifier (for identifying the specific still image frame of the broadcast that was displayed), the telestrator data defining selected region 120 drawn by the user, as well as the time and channel/station identifier information (step 248). In one implementation, receiver 36 can directly determine, and then transmit, the frame number associated with the paused image frame when frame numbers (and optionally program identifiers) are transmitted in the VBI of the video data stream. The telestrator receiver application then returns to the background to monitor for subsequent pause commands, causing receiver 36 to resume normal playback of the broadcast television signal.

Processing of Information Look-Up Requests

Information lookup system 50 includes information database 56 for storing information related to one or more objects of interest associated with a television broadcast. Information database 56 can be a relational database including a plurality of related tables. Information database 56 can maintain, for a given television broadcast or program, an object locator table including fields, as described below, allowing for identification of one or more objects of interest, if any, included in telestrator data corresponding to an image frame. More specifically, these objects of interest are generally found in one or more image frames of a given television broadcast, and can be identified within those image frames by selected region 120, which is defined by the telestrator data.

To process information lookup requests transmitted from receiver 36, information associated with one or more objects of interest can be stored in relation to image frame and position information. FIG. 4 provides one example of an object locator table, according to an implementation of the invention, corresponding to a given television program. In the implementation of FIG. 4, the object locator table provides the positional parameters (x,y) of objects (1 to N) included in a broadcast program relative to a frame or range of frames that make up the video frame. The frame identifiers can be expressed as time values from a zero start value (e.g., hh:mm:sec:frame), or as contiguous frame numbers. For each frame or range of frames, the object locator table can include x, y positional parameters associated with objects, if any, contained within the image frames. In one implementation, the x, y positional parameters are x, y pixel values; in another implementation, the x, y parameters are expressed as a composite x-ratio, y-ratio relative to the aspect ratio of the image. For example, using the upper left-hand corner of the image as the origin, an x,y coordinate value of (0.25, 0.33) indicates that the x coordinate is ¼ of the image width horizontally from the origin, while the y coordinate is ⅓ of the image height down from the origin.

For each object, a variety of x, y positional parameters can be used. For example, as to a given frame set, the x, y parameters for an object of interest can represent a nominal center point of the object within each frame corresponding to the image frame set. The x, y positional parameters can also be expressed as a range of x and y coordinate values. Furthermore, the nominal center point of a given object may be expressed as a set of x, y coordinates, all of which must be included in the telestrator data to be deemed a match. In another implementation, the positional parameters can comprise a set of coordinates defining the outline of an object in relation to an origin. One of skill in the art will recognize that myriad combinations are possible.

In one implementation, the producer of a particular broadcast program can create an object locator table by identifying one or more objects of interest for which more information is available. Then, for each object, the producer can populate an object locator table by providing a plurality of frame sets and the corresponding x, y coordinate values associated with the identified objects of interest. In addition, FIG. 5 illustrates an object information table that includes computer network addresses corresponding to information (e.g., product information, advertisements, and coupons) about the objects of interest.

FIG. 6 illustrates one implementation of a method for processing information lookup requests submitted by receiver 36 in response to a user command. As discussed above, an information lookup request, in one implementation, comprises a user identifier, a channel or broadcast station identifier, a time value associated with the pause command, and telestrator data defining selected region 120 drawn by the user. As FIG. 6 shows, when information lookup system 50 receives a lookup request (step 302), it first attempts to identify the program identifier corresponding to the lookup request (step 304). In one implementation, information lookup system 50 can scan the station and/or channel identifier and time value against a set of station logs to determine the program, ad or other broadcast content corresponding to the lookup request. In other implementations, the program identifier may be embedded in the VBI (or the image portion) of the broadcast signal, which is detected by receiver 36 and transmitted, in addition to, or in lieu of, a station identifier. Using the program identifier, information lookup system 50 then scans information database 56 for an object locator table corresponding to the program (step 306).

If an object locator table is found, information lookup system 50 determines the frame identifier corresponding to the request (step 308). In one implementation, this can be accomplished by comparing the time value associated with the lookup request against the station log to locate a frame set identifier. In implementations where frame identification information is embedded in the video signal, such frame identifiers can be stored by receiver 36 and submitted to information lookup system 50 as part of the lookup request.

After the appropriate frame or frame set identifier has been determined, information lookup system 50 determines whether selected region 120 designated by the user (as defined by the telestrator data) encompasses any of the x,y coordinate values associated with objects for which information is available (steps 310 and 312). If one or more object identifiers are found (step 312), information lookup system 50 scans an object information table (see FIG. 5) to locate information about the objects (step 314). In one implementation, information lookup system 50 then transmits the computer network addresses or the data associated with the computer network addresses to the user.

As discussed above, information lookup system 50 maintains a user account database 54 including user account identifications and corresponding email addresses. Using this information, any object information can be packaged in an email and transmitted to the email address associated with the user identification in the lookup request. Of course, one skilled in the art will recognize that a variety of content delivery options are available. For example, information lookup system 50 can merely store the content or the results of the lookup request in association with the user's account. The lookup results can then be available to the user during a subsequent login. The lookup results can also be stored in an on-line synchronization utility to be downloaded to the user's client device 90 during his or her next synchronization operation.

In some implementations, certain features of digital video protocols and technologies can be used to facilitate the identification of objects within an image frame. The MPEG-4, Level 10 standard (as well as competing and/or similar standards) generates an image using multiple software objects. For example, using this standard, a picture may be composed of a background image object and a few smaller fixed or moving objects. The audio is delivered in one stream. First the background image object is established, and this is gradually updated as bandwidth permits. The center of interest and other objects are drawn and allowed to move in any direction or grow or shrink.

Accordingly, the transmitted data can include instructions regarding how the objects should change within the image. These types of activities use less bandwidth than a complete re-transmission of these objects or standard image frames. The background may be a moving window into a single large image. The most relevant aspect of the MPEG technology to the present invention is that at the time a user issues a "pause" command, the object visible in the image and designated by the user can be identified by receiver 36 which is decoding the MPEG signal and is aware of the area of interest designated by the user, whether the object is encompassed by selected region 120 or "clicked on" by the user using stylus 92. This object may move across the screen, change over time, or move due to the perspective of the camera, but it can still be identified as a specific software object. The user's designated area or stylus click can then be decoded to identify which object was selected. The selected object can then be processed as described above. This or a subsequent generation MPEG-Java or other programming capability will allow execution of this routine.

Other video protocols and technologies can also be used in the invention. For example, the SMPTE (Society of Motion Picture and Television Engineers) provides metadata formats that can be delivered with the stream of video data to allow for transmission of the show, episode and other metadata. These formats can be extended to support object identification for MPEG or equivalent or successor digital streams.

Other implementations, in addition to those already disclosed, are possible. For example, in one implementation, as part of the production process, a predefined set of image frames are created specifically for object identification purposes. According to one implementation, predefined image frames are provided wherein each predefined image frame corresponds to a plurality of image frames from the underlying video or television program. Accordingly, when a user pauses the transmission broadcast for purposes of identifying an object, receiver 36 presents the predefined image frame that corresponds to or is associated with the image frame that was being shown at the time the user paused the video playback.

In this implementation, the predefined image frame can contain all objects in, and can closely resemble, the image frame that corresponds to the time when the user paused the video broadcast. Alternately, the predefined image frame can look completely dissimilar to the image frame that was being shown when the user paused the video broadcast. For example, if the image frame that was being displayed when the user transmits the pause command has three objects of interest, the predefined image frame that is now shown by receiver 36 can simply contain the three objects of interest. This makes identifying the object that the user is interested in an easier task. This implementation greatly reduces the number of frames for which object locations must be identified. In one implementation, the set of predefined image frames can be transmitted to receiver 36 and stored in a buffer or on a hard disk for access as required. In another implementation, receiver 36 transmits requests for a predefined image frame from a predefined set stored at a remote location, such as DBS system 30 or cable television system 40.

In another implementation, receiver 36 transmits a representation of the image frame associated with the pause command to client device 90 for display on screen 94 to allow a user to view the objects of interest in the screen display box 102 and more easily define selected region 120. In such an implementation, receiver 36 need not pause playback of the video broadcast.

Figure 7:
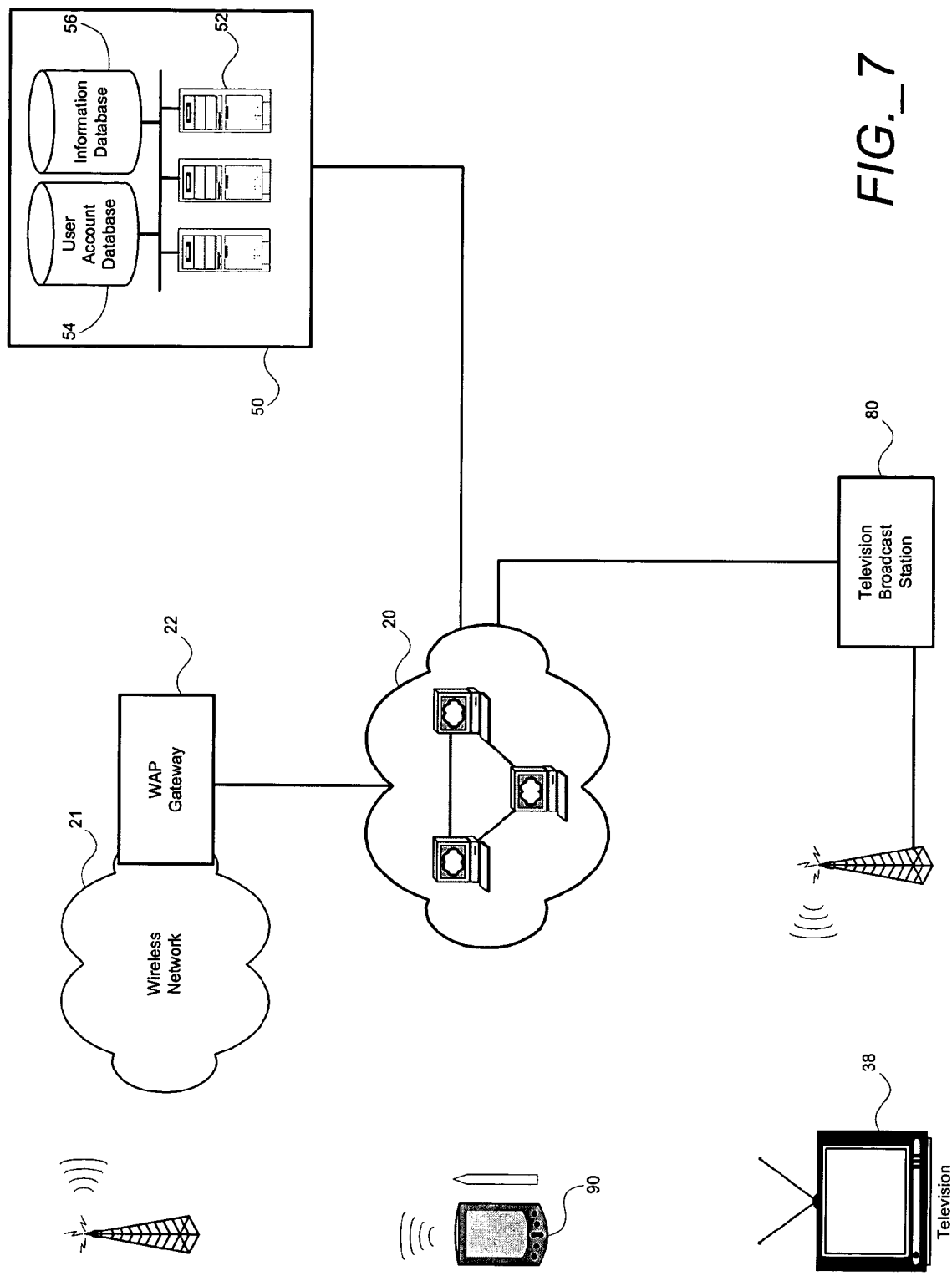
FIG. 7 is a functional block diagram setting forth an interactive information retrieval system according to an implementation of the invention.

FIG. 7 illustrates an implementation where the methods of the invention can be carried out without the use of receiver 36. In this implementation, the commands for a given image frame can be transmitted between client device 90 and information lookup system 50 over a wireless communications medium. In one implementation, the functionality of information lookup system 50 is incorporated into a television broadcast station 80. Television broadcast station 80 and information lookup system 50 can communicate data such as station logs and image frame files over computer network 20.

In this implementation, when a user sees an object during a television broadcast about which he desires more information, the user can activate a command on client device 90 that is communicated via wireless network 21 and WAP gateway 22 to information lookup system 50. This command is similar to the pause command discussed above and identifies the channel to which television 38 is tuned and optionally includes a time stamp. Information lookup system 50, having information regarding the tuned channel and the time (either by when the command was received or the optional time stamp), can then determine the image frame number or range of frame numbers that is likely to have been displayed at the time the user issued the pause command. Information lookup system 50 can then transmit to client device 90 one or more image frames from its files that are similar to the image frame displayed about the time that the "pause" command was transmitted, along with the positional parameters associated with one or more objects of interest in the image.

In one implementation, the image transmitted to client device 90 from information lookup system 50 can be a composite of two or more scenes in the event that the scenes change frequently in the segment of the television program that the "pause" command was issued; this can address implementations of the system where resolution of the frame number is inhibited by delays associated with the system and/or the user in activating or initiating a pause command. In one implementation, the positional parameters include one corner x, y and a distance to opposite corner $\Delta x$, $\Delta y$. In one embodiment, multiple boxes (as defined by corner-delta values) may be required to form the item.

Upon receipt of the image frame data from information lookup system 50, client device 90 displays the image frame on the user interface 96, allowing the user to define a selected region 120 including one or more objects of interest. In one implementation, the client application installed on client device 90 reviews the selected region 120 (or tap point or scribble) drawn by the user against the positional parameters associated with the image frame to find at least a few points or pixels inside one of the boxes defining the available objects. If any objects are found, the object identifiers are transmitted to information lookup system 50 over wireless network 21 and WAP gateway 22, and information lookup system 50 can return information relating to the one or more objects of interest.

The invention has been described with reference to specific implementations. Other implementations of the invention will be apparent to those of ordinary skill in the art. For example, the functionality of information lookup system 50 may be integrated into DBS sytem 30 or cable television system 40. It is, therefore, intended that the scope of the invention not be limited to the implementations described above.

The invention claimed is:

1. A method for graphically generating a search query for transmission to a remote information system comprising:
    transmitting a broadcast to a display device;
    receiving a command to pause the broadcast from a remote device wherein the remote device has a display screen;
    transmitting a still image frame to the display device and the remote device upon receiving the pause command wherein the still image frame comprises a predefined image frame that corresponds to an image frame of the broadcast that was displayed at substantially the moment when the pause command was received;
    receiving telestrator data designating at least a portion of the still image frame and data identifying a user wherein the telestrator data is generated from the user designating a selected region on the display screen of the remote device;

generating the search query comprising the telestrator data, the data identifying the user, and data identifying the still image frame; and transmitting the search query to the remote information system.

2. The method of claim 1, further comprising displaying the telestrator data on the display device.

3. The method of claim 2, wherein the telestrator data is overlaid onto the still image frame displayed on the display device.

4. The method of claim 1, wherein the broadcast comprises a satellite broadcast or a cable broadcast.

5. The method of claim 1, wherein the broadcast comprises a previously recorded broadcast stored on a storage device.

6. The method of claim 1, wherein the still image frame comprises an image frame of the broadcast that was displayed at substantially the moment when the pause command was received.

7. The method of claim 1, wherein the telestrator data designates an object of interest in the still image frame.

8. The method of claim 7, wherein the telestrator data comprises lines and/or curves enclosing the object of interest within the still image frame.

9. The method of claim 7, wherein the telestrator data comprises one or more pixels placed directly atop the object of interest within the still image frame.

10. The method of claim 7, wherein the telestrator data comprises a scribble placed directly atop the object of interest within the still image frame.

11. The method of claim 7, wherein the object of interest is an object shown in the still image frame for which the user desires further information.

12. The method of claim 1, wherein transmitting the query to a remote information system is carried out over a telephone network.

13. The method of claim 1, wherein transmitting the query to a remote information system is carried out over a computer network.

14. The method of claim 13, wherein the computer network comprises the Internet.

15. The method of claim 1, wherein transmitting the query to a remote information system is carried out over a wireless network.

16. The method of claim 1, wherein the commands and the data are received in the form of wireless signals.

17. The method of claim 16, wherein the wireless signals comprise infrared signals.

18. The method of claim 16, wherein the wireless signals comprise Bluetooth signals.

19. The method of claim 16, wherein the wireless signals comprise 802.11 signals.

20. The method of claim 1, wherein the data identifying the still image frame comprises a frame number.

21. The method of claim 1, wherein the data identifying the still image frame comprises a time value.

22. The method of claim 1, wherein the data identifying the still image frame is found in the vertical blanking interval.

23. The method of claim 1, wherein the data identifying the still image frame is found in the broadcast signal.

24. The method of claim 1, wherein the data identifying the still image frame includes a program identifier.

25. The method of claim 1, wherein the display device comprises a television.

26. An apparatus for graphically generating a search query for transmission to a remote information system comprising:

a processor;

a memory;

a wireless communications system;

a software application, physically stored in the memory, for generating a query, comprising instructions operable to cause the processor and the apparatus to:

transmit a broadcast to a display device;

receive a command to pause the broadcast from a remote device wherein the remote device has a display screen;

transmit a still image frame to the display device and the remote device upon receiving the pause command wherein the still image frame comprises a predefined image frame that corresponds to an image frame of the broadcast that was displayed at substantially the moment when the pause command was received;

receive telestrator data designating at least a portion of the still image frame and data identifying a user wherein the telestrator data is generated from the user designating a selected region on the display screen of the remote device;

generate the search query comprising the telestrator data, the data identifying the user, and data identifying the still image frame; and transmit the search query to the remote information system.

27. The apparatus of claim 26, wherein the wireless communications system comprises an infrared communications system.

28. The apparatus of claim 26, wherein the wireless communications system comprises a Bluetooth communications system.

29. The apparatus of claim 26, wherein the wireless communications system comprises an 802.11 communications system.

30. The apparatus of claim 26, wherein the software application further comprises instructions operable to cause the processor and the apparatus to display the telestrator data on the display device.

31. The apparatus of claim 30, wherein the telestrator data is overlaid onto the still image frame displayed on the display device.

32. The apparatus of claim 26, wherein the still image frame comprises an image frame of the broadcast that was displayed at substantially the moment when the pause command was received.

33. The apparatus of claim 26, wherein the telestrator data designates an object of interest in the still image frame.

34. The apparatus of claim 26, wherein transmitting the query to a remote information system is carried out over a telephone network, a computer network, or a wireless network.

35. The apparatus of claim 26, wherein the commands and the data are received in the form of wireless signals.

36. The apparatus of claim 35, wherein the wireless signals comprise infrared signals, Bluetooth signals, or 802.11 signals.

37. The apparatus of claim 26, wherein the data identifying the still image frame includes a program identifier.

38. A computer program product, physically stored on a machine-readable medium, for graphically generating a search query for transmission to a remote information system, comprising instructions operable to cause a programmable processor to:

transmit a broadcast to a display device;

receive a command to pause the broadcast from a remote device wherein the remote device has a display screen;

transmit a still image frame to the display device and the remote device upon receiving the pause command wherein the still image frame comprises a predefined image frame that corresponds to an image frame of the broadcast that was displayed at substantially the moment when the pause command was received;

receive telestrator data designating at least a portion of the still image frame and data identifying a user wherein the telestrator data is generated from the user designating a selected region on a selected region of a display screen of the remote device;

generate the search query comprising the telestrator data, the data identifying the user, and data identifying the still image frame; and transmit the search query to the remote information system.

39. A data processing system for graphically generating a search query for transmission to a remote information system, comprising:

means for transmitting a broadcast to a display device;

means for receiving a command to pause the broadcast from a remote device wherein the remote device has a display screen;

means for transmitting a still image frame to the display device and the remote device upon receiving the pause command wherein the still image frame comprises a predefined image frame that corresponds to an image frame of the broadcast that was displayed at substantially the moment when the cause command was received;

means for receiving telestrator data designating at least a portion of the still image frame and data identifying a user wherein the telestrator data is generated from the user designating a selected region on the display screen of the remote device;

means for generating the search query comprising the telestrator data, the data identifying the user, and data identifying the still image frame; and means for transmitting the search query to the remote information system.

40. A method for graphically generating a search query for transmission to a remote information system comprising:

transmitting a pause command to a receiver wherein the pause command results in a still image frame on a display device;

receiving still image data describing the still image frame wherein the still image frame comprises an image frame of a broadcast that was displayed by the receiver at substantially the moment when the pause command was transmitted;

displaying a representation of the still image frame on a display screen based on the transmitted still image data;

receiving user input comprising telestrator data designating a portion of the representation wherein the telestrator data is generated from a user designating a selected region on the display screen and wherein the telestrator data contains search parameter information to be used as a basis for the search query;

transmitting the telestrator data to the receiver; and transmitting data identifying the user to the receiver.

41. The method of claim 40, wherein the still image frame comprises a box having an aspect ratio that corresponds to an aspect ratio of a broadcast displayed by the receiver.

42. The method of claim 40, wherein the telestrator data designates an object of interest in the still image frame.

43. The method of claim 42, wherein the telestrator data comprises lines and/or curves enclosing the object of interest within the still image frame.

44. The method of claim 42, wherein the telestrator data comprises one or more pixels placed directly atop the object of interest within the still image frame.

45. The method of claim 42, wherein the telestrator data comprises a scribble placed directly atop the object of interest within the still image frame.

46. The method of claim 42, wherein the object of interest is an object shown in the still image frame for which the user desires further information.

47. The method of claim 40, wherein the commands and the data are transmitted in the form of wireless signals.

48. The method of claim 47, wherein the wireless signals comprise infrared signals.

49. The method of claim 47, wherein the wireless signals comprise Bluetooth signals.

50. The method of claim 47, wherein the wireless signals comprise 802.11 signals.

51. An apparatus for graphically generating a search query for transmission to a remote information system comprising:

a display screen;

a user interface;

a wireless communications system;

a processor;

a memory; and a client application, physically stored in the memory, for generating a query, comprising instructions operable to cause the processor and the apparatus to:

transmit a pause command to a receiver wherein the pause command results in a still image frame on a display device;

receive still image data describing the still image frame wherein the still image frame comprises an image frame of a broadcast that was displayed by the receiver at substantially the moment when the pause command was transmitted;

display a representation of the still image frame on the display screen;

receive user input comprising telestrator data designating a portion of the representation wherein the telestrator data is generated from a user designating a selected region on the display screen and wherein the telestrator data contains search parameter information to be used as a basis for the search query;

transmit the telestrator data to the receiver; and transmit data identifying the user to the receiver.

52. The apparatus of claim 51, wherein the still image frame comprises a box having an aspect ratio that corresponds to an aspect ratio of a broadcast displayed by the receiver.

53. The apparatus of claim 51, wherein the telestrator data designates an object of interest in the still image frame.

54. The apparatus of claim 51, wherein the object of interest is an object shown in the still image frame for which the user desires further information.

55. The apparatus of claim 51, wherein the commands and the data are transmitted in the form of wireless signals.

56. The apparatus of claim 55, wherein the wireless signals comprise infrared signals.

57. The apparatus of claim 55, wherein the wireless signals comprise Bluetooth signals.

58. The apparatus of claim 55, wherein the wireless signals comprise 802.11 signals.

59. A computer program product, physically stored on a machine-readable medium, for graphically generating a search query for transmission to remote information system, comprising instructions operable to cause a programmable processor to:

transmit a pause command to a receiver wherein the pause command results in a still image frame on a first display device;

receive still image data describing the still image frame wherein the still image frame comprises an image frame of a broadcast that was displayed by the receiver at substantially the moment when the cause command was transmitted;

display a representation of the still image frame on a display screen;

receive user input comprising telestrator data designating a portion of the representation wherein the telestrator data is generated from a user designating a selected region on the display screen and wherein the telestrator data contains search parameter information to be used as a basis for the search query;

transmit the telestrator data to the receiver; and transmit data identifying the user to the receiver.

60. A data processing system for graphically generating a search query for transmission to a remote information system, comprising:

means for transmitting a pause command to a receiver wherein the pause command results in a still image frame on a display device;

means for receiving still image data describing the still image frame wherein the still image frame comprises an image frame of a broadcast that was displayed by the receiver at substantially the moment when the pause command was transmitted;

means for displaying a representation of the still image on a display screen of the data processing system;

means for receiving user input comprising telestrator data designating a portion of the representation wherein the telestrator data is generated from a user designating a selected region on the display screen and wherein the telestrator data contains search parameter information to be used as a basis for the search query;

means for transmitting the telestrator data to the receiver; and means for transmitting data identifying the user to the receiver.

61. A method for retrieving information, about an object, utilizing a graphically generated search query transmitted from a remote location comprising:

receiving the search query comprising telestrator data, data identifying a user, data identifying a still image frame, and a program identifier wherein the telestrator data is generated from the user designating a selected region on a first display screen of a first device that displays a still image frame wherein the still image frame is also displayed on a second display screen of a second device, wherein the still image frame comprises an image frame of a broadcast that was displayed by a receiver at substantially the moment when a pause command was transmitted;

identifying an object locator table associated with the program identifier;

retrieving a portion of the object locator table based on the data identifying the still image frame;

identifying objects of interest in the retrieved portion of the object locator table using the telestrator data; and providing information associated with the identified objects of interest to the user.

62. The method of claim 61, wherein the program identifier is station identification information, channel identification information, or vertical blanking interval data.

63. The method of claim 61, wherein the data identifying the still image frame is a frame number or a time value.

64. The method of claim 61, wherein the object locator table comprises a relational database.

65. The method of claim 61, wherein the telestrator data comprises x, y positional parameters on the still image frame or x, y composite ratios relative to the image aspect of the still image frame.

66. The method of claim 61, wherein providing information to the user comprises sending an e-mail to the user, providing the information on an Internet website for the user, or transmitting the information to a client device of the user.

67. An apparatus for retrieving information, about an object, utilizing a graphically generated search query transmitted from a remote location to the apparatus comprising:

a processor;

a memory;

a communications system;

a software application, physically stored in the memory, for generating a query, comprising instructions operable to cause the processor and the apparatus to:

receive the search query comprising telestrator data, data identifying a user, data identifying a still image frame, and a program identifier wherein the telestrator data is generated from the user designating a selected region on a display screen of a first device that displays a still image frame wherein the still image frame is also displayed on a second display screen of a second device, wherein the still image frame comprises an image frame of a broadcast that was displayed by a receiver at substantially the moment when a pause command was transmitted;

identify an object locator table associated with the program identifier;

retrieve a portion of the object locator table based on the data identifying the still image frame;

identify objects of interest in the retrieved portion of the object locator table using the telestrator data; and provide information associated with the identified objects of interest to the user.

68. A computer program product, physically stored on a machine-readable medium, for retrieving information, about an object, utilizing a graphically generated search query transmitted from a remote location, comprising instructions operable to cause a programmable processor to:

receive the search query comprising telestrator data, data identifying a user, data identifying a still image frame, and a program identifier wherein the telestrator data is generated from the user designating a selected region on a display screen of a first device that displays a still image frame wherein the still image frame is also displayed on a second display screen of a second device, wherein the still image frame comprises an image frame of a broadcast that was displayed by a receiver at substantially the moment when a pause command was transmitted;

identify an object locator table associated with the program identifier;

retrieve a portion of the object locator table based on the data identifying the still image frame;

identify objects of interest in the retrieved portion of the object locator table using the telestrator data; and provide information associated with the identified objects of interest to the user.

69. A data processing system for retrieving information, about an object, utilizing a graphically generated search query transmitted from a remote location comprising:

means for receiving the search query comprising telestrator data, data identifying a user, data identifying a still image frame, and a program identifier wherein the telestrator data is generated from the user designating a selected region on a display screen of a first device that displays a still image frame wherein the still image frame is also displayed on a second display screen of a second device, wherein the still image frame comprises an image frame of a broadcast that was displayed by a receiver at substantially the moment when a pause command was transmitted;

means for identifying an object locator table associated with the program identifier;

means for retrieving a portion of the object locator table based on the data identifying the still image frame;

means for identifying objects of interest in the retrieved portion of the object locator table using the telestrator data; and means for providing information associated with the identified objects of interest to the user.

* * * * *

UNITED STATES PATENT AND TRADEMARK OFFICE
CERTIFICATE OF CORRECTION

| | | |
|---|---|---|
| PATENT NO. | : 7,240,075 B1 | Page 1 of 1 |
| APPLICATION NO. | : 10/670998 | |
| DATED | : July 3, 2007 | |
| INVENTOR(S) | : Frank Robert Nemirofsky and Larry A. Lincoln | |

It is certified that error appears in the above-identified patent and that said Letters Patent is hereby corrected as shown below:

Column 17, line 10, change "cause" to --pause--

Signed and Sealed this

Twenty-first Day of August, 2007

JON W. DUDAS
*Director of the United States Patent and Trademark Office*